(12) United States Patent
Mukherjee et al.

(10) Patent No.: US 7,917,489 B2
(45) Date of Patent: Mar. 29, 2011

(54) IMPLICIT NAME SEARCHING

(75) Inventors: Rajat Mukherjee, San Jose, CA (US);
Irfan Presswala, Ann Arbor, MI (US);
Kalpana Ravinarayanan, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 341 days.

(21) Appl. No.: 11/724,637

(22) Filed: Mar. 14, 2007

(65) Prior Publication Data
US 2008/0228720 A1 Sep. 18, 2008

(51) Int. Cl.
*G06F 7/00* (2006.01)
*G06F 17/30* (2006.01)

(52) U.S. Cl. ......... 707/707; 707/708; 707/765; 707/767

(58) Field of Classification Search ................... 707/1, 3, 707/5, 706, 707, 708, 718, 726, 727, 731, 707/750, 765, 767; 706/45
See application file for complete search history.

(56) References Cited

U.S. PATENT DOCUMENTS

| | | | |
|---|---|---|---|
| 6,816,858 B1 * | 11/2004 | Coden et al. | 707/750 |
| 6,968,332 B1 * | 11/2005 | Milic-Frayling et al. | 707/3 |
| 7,403,932 B2 * | 7/2008 | Kao et al. | 706/45 |
| 7,519,588 B2 * | 4/2009 | Mason | 1/1 |
| 2006/0116994 A1 * | 6/2006 | Jonker et al. | 707/3 |
| 2008/0005090 A1 * | 1/2008 | Khan et al. | 707/4 |
| 2008/0065623 A1 * | 3/2008 | Zeng et al. | 707/5 |
| 2008/0222119 A1 * | 9/2008 | Dai et al. | 707/4 |
| 2009/0119274 A1 * | 5/2009 | Tsuzuki et al. | 707/5 |
| 2010/0082590 A1 * | 4/2010 | Nye | 707/706 |

* cited by examiner

*Primary Examiner* — Don Wong
*Assistant Examiner* — Merilyn P Nguyen
(74) *Attorney, Agent, or Firm* — Hickman Palermo Truong & Becker LLP

(57) ABSTRACT

Techniques and tools described herein provide mechanisms for displaying information that is contextually related to a search query. Using these techniques and tools, a user can lookup and discover a person or other entity from contextually related information. For example, if the user submits a search query on the title of a song (e.g., "Janie's got a gun"), then, in addition to a variety of documents related to the title of the song, the user may be presented with information about a related entity such as "Aerosmith" (e.g., the band that sings the song). In this way, the techniques and tools provide mechanisms that identify information that is not directly related to the search query, but that is information the user may find useful or interesting based on context of the search query.

22 Claims, 5 Drawing Sheets

FIG. 3

IMPLICIT NAME SEARCHING

BACKGROUND

A variety of mechanisms are available to help users search and navigate electronic information. For example, many electronic resources employ a search engine to help users locate information. To locate information on a particular topic, a search engine allows users to submit one or more search query terms related to a topic of interest. In response, the search engine executes the search query, consults its indexes, and generates information about the results of the search. The information about the results of the search, referred to herein as the "search results", usually contains a list of resources that satisfy the search query and some attributes of those sources.

While search engines may be applied in a variety of contexts, one common use is navigating through document repositories by searching for documents of interest. Therefore, web search engines are especially useful for locating resources that are accessible on the Internet, as the Internet can be thought of as a large repository of resources. Many searching techniques are used by Internet search engines to populate their indexes and organize them in searchable ways. For example, an Internet search engine might read or "crawl" pages on the Internet to create entries for its search index, and then use that index when determining which pages are relevant to a search query. Accordingly, current web search engines have very large document indexes, which means that the web search engines can provide deep coverage of Internet resources.

The resources identified in Internet search results often include files whose content is composed in a page description language such as Hypertext Markup Language (HTML). Such files are typically called web pages. Using a web browser, a web page may be retrieved by entering its Universal Resource Locator (URL) in a web browser. A URL is basically the electronic address of a web page. Internet search results may therefore be presented to a user as a list of hypertext links to the URLs of matching resources. Users retrieve a document or resource of interest found in a search by selecting, in a web browser, the resource's hypertext link or URL found in the search results.

Unfortunately, search results may contain many irrelevant results that are returned based merely on the keywords the user submitted to the search engine. As a result, the search results do not return what the user was really looking for. Basically, search engines do not consider the keywords in their context. For example, suppose a user wants to find out information about a book, but the user only knows a few words from it (e.g., "It was the best of times."). Since, search engines rely almost exclusively on search terms provided by the user to find and display information to the user, the search results suggested by a search engine are heavily based on the search terms and do not take into account context and other forms of data that may be useful in helping a user find relevant information on the web. Thus, submitting the phrase "it was the best of times" may bring up thousands of irrelevant search results that have nothing to do with Charles Dickens or the book "Tale of Two Cities."

The approaches described in the section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 3 illustrates an example search results page that includes name entity data, according to an embodiment of the invention;

DETAILED DESCRIPTION

Figure 1:
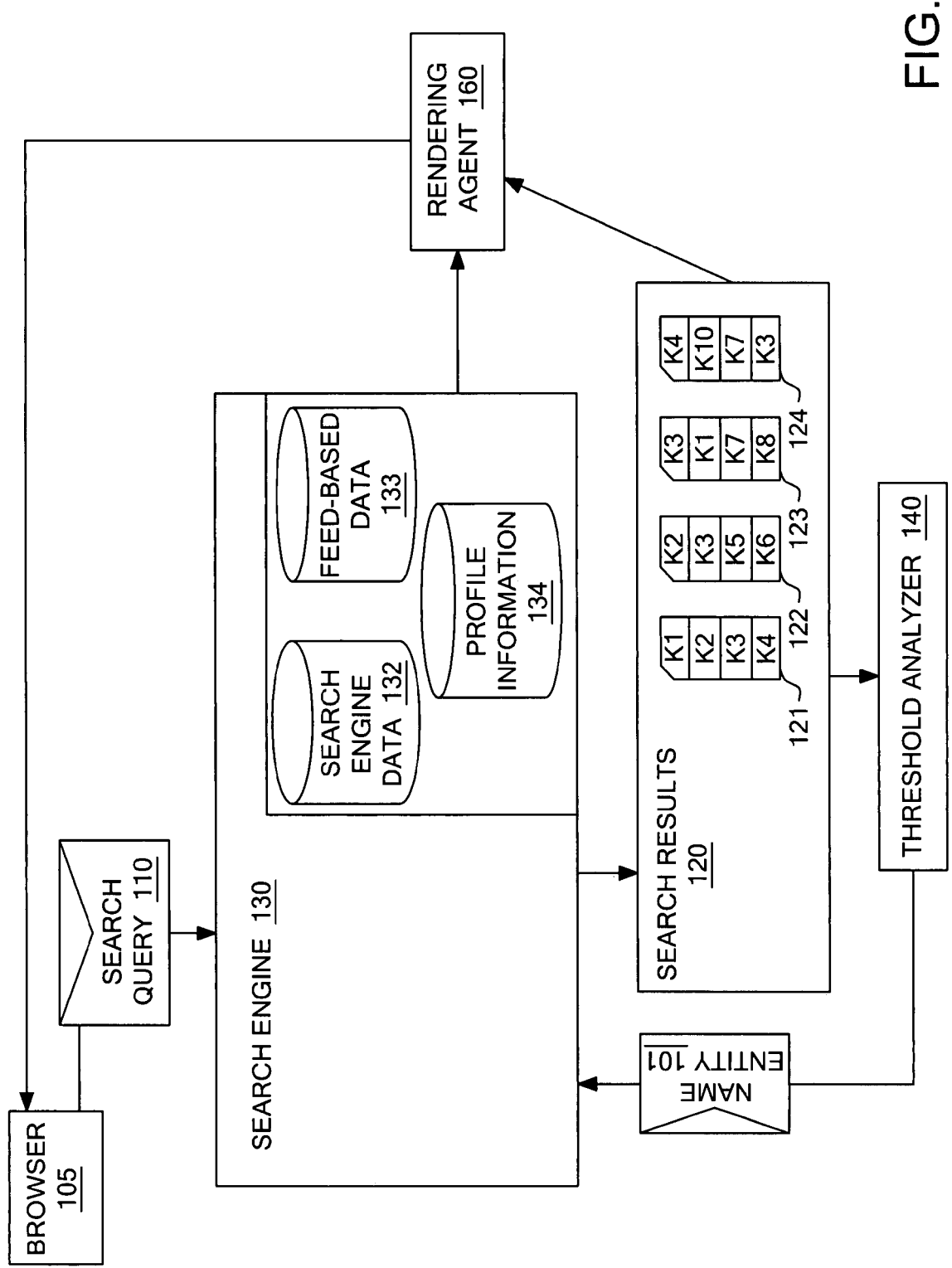
FIG. 1 illustrates a block diagram of an example system for identifying a name entity and displaying data about the name entity, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques and tools described herein provide mechanisms for displaying information that is contextually related to a search query. Using these techniques and tools, a user can view and discover a person or other entity from contextually related information. For example, if the user submits a search query on the title of a song (e.g., "Janie's got a gun"), then, in addition to a variety of documents related to the title of the song, the user may be presented with information about a related entity such as the band that sings the song (e.g., "Aerosmith").

According to one embodiment, a search engine mechanism evaluates search results, fetches key terms and phrases associated from the search results, and uses those terms to help identify the additional information contextually related to the search query.

According to one embodiment, a mechanism selects one or more of the key terms or phrases from the search results. A variety of heuristics may be used to select the key terms or phrases. For example, key terms and phrases that have common occurrence within the search results may be considered as candidate entities to be profiled.

Once a person or entity has been selected, a mechanism displays the information about the selected person or entity. According to one embodiment, the information selected for display can be retrieved through a dynamic or predetermined template, or the information can come from other databases.

In this way, information that is not directly related to a search query, but interesting may be identified based on the context of the search query.

Web-Based Environment

Even though the techniques described herein are described in terms of a search engine and/or Internet environment, these environments are meant only to serve as exemplary environments in which the techniques of the present invention are employed. In alternative implementations, the techniques may be employed in other environments. For example, the techniques could be employed outside a web browser in a news reader application, desktop search application, or document editor.

Name Entity

The term "name entity" as used herein can apply to a wide variety of subject matter. A name entity can be a person (e.g., celebrity, artist, author, athlete, or other famous person), organization, (e.g., United Nations, World Bank), institution (e.g., Harvard University), song, album, book, motion picture, software application, food items, other consumer products, toys, electronic goods, or any other known or perceived object. In one embodiment, a name entity is derived by analyzing the search results for a search query to find a common object or theme that the user might be interested in.

For example, suppose a user submits a search query on the term "Chicago Bulls" to a web search engine. The web search engine performs a search and notices that "Michael Jordan" is common to many of the search results. Since Michael Jordan is a person and he played for the Chicago Bulls basketball team, he may be identified as a name entity for that particular search query. Thus, even though Michael Jordan was not specified in the original search query, since his name comes up often in the search results, he may be a person the user who performed the search is interested in and identified as a name entity for the search query.

Similarly, a search query for "The Splendid Splinter" (a nickname for Ted Williams) submitted to a search engine might return as a name entity the Boston Red Sox, because the Boston Red Sox are indirectly related to Ted Williams. By identifying a name entity and retrieving information about the name entity, a search engine can render information that may be implicit to a user's search query.

Other examples of identifying name entities may include executing a search in a search engine for the book "The World is Flat". The returned name entity might be its author "Thomas L. Friedman". A search for popular movie dialogue might return the actor that made the statements (e.g., a search for the term, "I'll be back" returns Arnold Schwarzenegger). A search on medical symptoms may return a drug name that relieves though symptoms.

In one embodiment, more than one name entity can be associated with a search query.

Name Entity Metadata

"Name entity metadata" can include a wide range of information. Examples of name entity metadata include, but are not limited to, (1) profile information, (2) search engine data, and (3) feed-based data. Each of these types of name entity metadata is described in greater detail hereafter. Briefly, however, name entity metadata is information that can be rendered and displayed in a browser whenever a name entity is derived from a search query. Name entity metadata can include any relevant or interesting information about the name entity.

For example, suppose Ted Williams, the baseball player, is identified as a name entity for a search query on "The Splendid Splinter". Name entity metadata for Ted Williams may include a photo, a summary of his career statistics, links to websites about him, links to shopping sites where memorabilia can be purchased, and other such information.

In this way, name entity metadata provides a way for a user to receive information implicit to his search query that he may not have been able to find explicitly.

Profile Information

Profile information generally refers to information that has been predetermined to refer to a name entity. The profile information may include data such as biographical information, photos or links to photos, links to other webpages, organizational information, product information, advertiser information, and other such information that has been associated with the name entity. When a name entity is identified, profile information for the name entity is retrieved from where it is stored and displayed as part of the name entity metadata.

In one embodiment, profile information is stored in a profile database indexed by name entity.

To illustrate, suppose LeBron James (a basketball player) is identified as a name entity. His profile information may include a photo, biographical information (e.g., his birthday and where he grew up), links to his homepage, links to his team's homepage, advertiser information (e.g., links to products he sponsors), information on how to get tickets to see him play, and other such information.

Profile information may be generated automatically through various search engine heuristics and analyses that correlate the information to a named entity, or, alternatively, it may be generated manually (e.g., users, advertisers, and webpage publishers can access the location the profile information is stored and add associate information with a name entity).

Search Engine Data

Search engine data refers to information generated by a search engine. This information can include static abstracts, active abstracts, additional links related to a particular web page, search results based on search queries, related topics and keywords, other suggested queries, and other such information. According to one embodiment, search engine data also includes other data and metadata about a page, e.g., publisher, date, author, tags, text from a web page, data from other repositories, etc.

Search engine data can also refer to data extracted during indexing. During indexing, a search engine extracts key terms and phrases from a web document and stores them as metadata associated with the document. In one embodiment, although these terms may or may not be displayed as part of search results, they are available as part of the index associated with the documents displayed in a search results set. These terms can then be algorithmically evaluated to help identify name entities.

Feed-Based Data

Feed-based data refers to information submitted to a search engine by a web page publisher and/or advertiser. The process of submitting feed-based data to the search engine varies. However, the typical example of feed-based data involves a web page publisher or advertiser establishing an online account with a search engine and submitting data to the search engine. For example, through an online account, a web page publisher submits information that they would like to be displayed whenever a particular name entity they are associated with is identified. Feed-based data can include links to other web pages, promotional offers, metadata (e.g., information about the title, author, date and publisher of a web page), keywords, and other related topics that may be useful to a user browsing searching for information.

For example, suppose a bank would like to highlight the low mortgage interest rates the. To do so, the bank creates a separate web page advertising their low mortgage interest rates. Then, the bank's web page publisher accesses an online account with a search engine and requests that whenever the search engine identifies this bank as a name entity, the web page advertising their low mortgage interest rates is included among the name entity metadata.

Exemplary System

FIG. 1 illustrates an exemplary system 100 for rendering name entity metadata when a user searches for information indirectly related to a name entity. To create, analyze, and render the name entity metadata, several tools of system 100 are illustrated in FIG. 1. In one embodiment, those tools include browser 105, search engine 130, threshold analyzer 140, and rendering agent 160. In other embodiments, system 100 may include a different set of tools and components.

The Browser

Browser 105 generally represents any software tool that allows a user to browse, navigate or view electronic documents. For example, browser 105 may be a web browser, a document viewer, RSS newsreader, mail client, document editor, a database client application, or other software tool for navigating a document corpus.

In one embodiment, browser 105 receives user input in the form of a search query and forwards search query 110 to search engine 130. A search query refers to search terms and phrases submitted by a user to a search engine in order to find information about a topic. For example, if a user would like information on used cars, then the user may submit a search query that includes the search term "used car" to a web search engine. The web search engine retrieves and displays search results related to the search terms.

Example Search Engine

In one embodiment, search engine 130 is a web search engine. Alternatively, search engine 130 may be a different type of search engine. Search engine 130 includes software tools to receive search query 110, to execute search query 110, and to generate search results 120 based on search terms in search query 110.

For example, search engine 130 receives search query 110 that contains the search terms "Janie's got a gun". Search engine 130 executes the search query and generates a set of search results 120. In one embodiment, the step of executing the search query by the search engine involves looking up information related to the search terms in a set of repositories. In one embodiment, search engine 130 uses indexes to find references, links, and other information that are related to the search query. The relatedness of the search terms to the search results is determined by the search engine's proprietary heuristics and algorithms that are not discussed in great detail herein.

As illustrated, search engine 130 includes the following set of repositories: search engine data repository 132, feed-based data repository 133, and profile database 134. In other embodiments, search engine 130 may include additional and/or a different set of repositories.

Data Repositories

Search engine data repository 132 refers to a repository, such as a database, that includes search engine data. For example, in a web environment, various search engines all have vast stores of data that have been indexed according to various proprietary algorithms and techniques. In one embodiment, search engine data repository 132 includes information from those vast stores of data. Search engines analyze the data in the search engine repositories to provide search results to users.

The feed-based data repository 133, in one embodiment, contains information submitted to the search engine by the publishers of a document and advertisers. The type of information that can be fed to the search engine varies. In one embodiment, the feed-based data includes information such as stock quotes, graphics, links to partner web pages, links to reviews of a product, promotional offers, and other such information. This can happen via feeds of data, using RSS, XML, text or other formats. The submitted data is stored in feed-based data repository 133.

The profile database 134, in one embodiment, contains profile information. According to one embodiment, the profile information is related to and indexed by name entity. The information in profile database 134 can be submitted to the search engine by users associated with the name entity, by other users, by publishers, advertisers, or in some other way. This can happen via feeds of data, using RSS, XML, text or other formats. The submitted data is stored in profile database 134. In one embodiment, the information in profile database 134 is generated and submitted by search engine 130 as it identifies relationships between a name entity and other information.

Although, various repositories have been described, it should be noted that, in one embodiment, the information contained in the described repositories can be separated into more repositories or combined into fewer repositories. In one embodiment, all the information associated with name entity metadata is combined into a single search engine repository.

Once the various forms of data in search engine data repository 132, feed-based data repository 133, and profile database 134 have been analyzed, sorted, stored and indexed by the search engine, the data is available to be included as a part of name entity metadata.

Thus, when a user accesses a search engine and performs a search query in the search engine, the user may receive name entity metadata as part of the search results.

Search Results

In one embodiment, search results are used to determine a name entity for a search query. Search results 120 refers to the documents and other information retrieved by search engine 130 in response to a search query. The actual number of search results for a given search query varies. The search results, in one embodiment, can come from any combination of the search engine's repositories. For example, search results may be extracted from both search engine data repository 132 and feed-based data repository 133.

In one embodiment, search results 120 are analyzed for key terms and phrases that appear repeatedly among the search results. Key terms and phrases that appear frequently among search results can become candidate name entities. For example, in FIG. 1, suppose search engine 130 returns documents 121-124. Documents 121-124 are analyzed to find common key terms and phrases. If a certain word or phrase appears often in those documents, that word or phrase can become a candidate name entity.

In one embodiment, this key term and phrase analysis is performed by search engine 130. Alternatively, it is performed by threshold analyzer 140.

Candidate Name Entity

A candidate name entity generally refers to key terms and phrases that meet basic threshold requirements to be considered as a name entity relative to a particular search. For example, if a minimum threshold requirement for a keyword to be identified as a name entity is that it appears in 80% of the search result documents and the keyword does appear in 80% or more of the documents, then it is designated as a candidate name entity until all key terms and phrases have been evaluated. Then, additional heuristics may be used to narrow down the candidate name entities until the preferred number of name entities remain.

Threshold Analyzer

In one embodiment, a threshold analyzer is a component of the search engine. Alternatively, it is separate from search engine. A threshold analyzer analyzes search results to identify keywords that were not in the search query, but are terms and phrases semantically related to the search topic. According to one embodiment, the terms and phrases are generated using the techniques described U.S. Pat. No. 6,947,930 issued to Anick et al. on Sep. 20, 2005 (the "Anick patent"), the contents of which are incorporated herein by reference. In other embodiments, it may be possible to get key terms and phrases from other sources of information (e.g., feeds) or from offline processing of the documents.

In FIG. 1, threshold analyzer 140 analyzes search results 120. This analysis may involve a subset of search results 120 or it may involve the entire set of search results. For example, if search engine 130 returns thousands of search results 120, threshold analyzer 140 may only evaluate the top ten results during its keyword analysis. In other embodiments, a different number of search results or a percentage of the search results may be analyzed.

In FIG. 1, search results 120 includes documents 121-124, which, according to one embodiment, represent a subset of the total amount of information returned as search results 120. Threshold analyzer 140 analyzes documents 121-124 to identify keywords that were not in the search query, but that appear frequently among the individual documents in search results 120. Keywords, in general, include terms and phrases that provide semantic and contextual meaning to a document. For example, common words such as "the", "and", "to", and other words that do not provide may be excluded as keywords since they may not provide semantic or contextual meaning. Similarly, terms that identify people, places, organizations, products, and other things may be extracted from the documents and used as keywords. For example, document 121 might include, among other terms and phrases, keywords such as "Janie", "gun", "Charles Dickens", "music", "Jazz", or any number of other terms or phrases. Keywords are illustrated in document 121 as k1, k2, k3, and k4.

Document 122 contains keywords k2, k3, k5, and k6. Document 123 includes keywords k3, k1, k7, and k8, and document 124 includes keywords k9, k10, k11, and k3. Note that in this example, each document 121-124 is shown as having four keywords. In other embodiments, each document in a set of search results may have a different number of keywords.

As mentioned above, there are well-defined search engine technologies for extracting keywords from search results documents, thus, the specific algorithms used by threshold analyzer 140 to extract keywords k1-k11 from documents 121-124 are not discussed herein. Although, it should be noted that in one embodiment, search engine 130 executes the algorithms that extract keywords from search results 120, and, then, sends the extracted keywords to the threshold analyzer for name entity analysis.

Once the keywords have been extracted from documents 121-124 in search results 120, threshold analyzer 140 analyzes the keywords to determine if there are any candidate name entities among the keywords. To do so, in FIG. 1, threshold analyzer 140 evaluates the keywords extracted from each of documents 121-124 and tries to identify common patterns, terms, or phrases among the documents and keywords.

As shown in FIG. 1, each of documents 121-124 includes at least one occurrence of the keyword k3. In one embodiment, threshold analyzer 140 detects those occurrences and performs additional analysis to determine if keyword k3 should be a candidate name entity. The additional analysis, in one embodiment, includes evaluating the number and percentage of documents that reference keyword k3, the number of occurrences of keyword k3 in each document, how recent each document is, overall relevance of each document, whether keyword k3 has any special meaning, whether keyword k3 has previously been identified as a name entity, whether the user has previously performed searches on keyword k3, how recently those searches occurred, whether there is an entry in a profile information database for the keyword, how often users search for keyword k3, and other such factors. These and other heuristics or a combination of these and other heuristics, in one embodiment, can serve as threshold requirements for a keyword to become a candidate name entity.

Assume for this example that a keyword has to appear in at least half of the analyzed documents in the search results to be considered as a candidate name entity. Accordingly, threshold analyzer 140 detects that keyword k3 appears in each of documents 121-124, thus, meeting the threshold requirement. Keyword k3, therefore, is a candidate name entity.

Similarly, keywords k1 and k2 each appear in two different documents in search results 120. Since both appear in at least half the analyzed documents in search results 120, keywords k1 and k2 also meet the threshold requirement and, therefore, also are identified as candidate name entities.

In one embodiment, when there are multiple candidate name entities a set of rules and heuristics may be used to pick between them. What those rules and heuristics are will vary based on implementation. For example, choosing a name entity from among multiple candidate name entities may simply involve determining user preference or developer preference, how frequently a keyword occurs among documents, whether a keyword appears in more recent documents, how many times a candidate name entity appears in other search queries, how many search results a candidate name entity returns, and other such factors.

In other embodiments, when there are multiple candidate name entities two or more of them may be designated as name entities. Although, which are picked again depends on the rules and heuristics governing name entity selection.

In the above scenario where k1, k2, and k3 are all candidate name entities, assume that only one name entity will be selected by threshold analyzer 140. Accordingly, after threshold analyzer 140 has identified candidate name entities k1, k2, and k3, it selects one of them by performing additional analysis. In one embodiment, it applies the rule that the candidate name entry that appears in the greatest number of documents is selected. Using this rule, k3 is selected as the name entity since it appears in all four documents 121-124.

Alternatively, assume that threshold analyzer 140 applies a rule that selects the keyword associated with the most search queries for the day. If a large number of users submit search queries relating to k2 during the day, then, under this rule, it becomes the name entity.

In another embodiment, threshold analyzer 140 compares keywords k1, k2, and k3 to an index for profile information database 134 to see if an entry exists for any of the keywords. Assume that one exists for keyword k1, but not for k2 or k3. In this example, keyword k1 becomes the name entity.

In other situations, other rules may be used to select between candidate name entities.

Once a name entity has been identified, name entity metadata is retrieved for the name entity. This can be done by submitting name entity 101 to search engine 130. Search engine 130 executes a search query using name entity 101 as its search term. The resulting search results are included as name entity metadata. Alternatively, name entity 101 is submitted to a separate profile information database, where name entity metadata may be retrieved.

Rendering Agent

A rendering agent refers to a software tool that compiles search results information with name entity metadata into a document to be sent to the user. In one embodiment, a rendering agent is part of a browser, or it might be part of a search engine. Alternatively, it is a separate component.

Rendering agent 160, in FIG. 1, compiles the original search results 120 obtained in connection with search query 110 and the name entity metadata to create a search results page. The name entity metadata is included as part of the search results page in order to enhance the information provided to the user. Once the search results page has been compiled, it is sent to browser 105 where it is displayed to the user.

Figure 2:
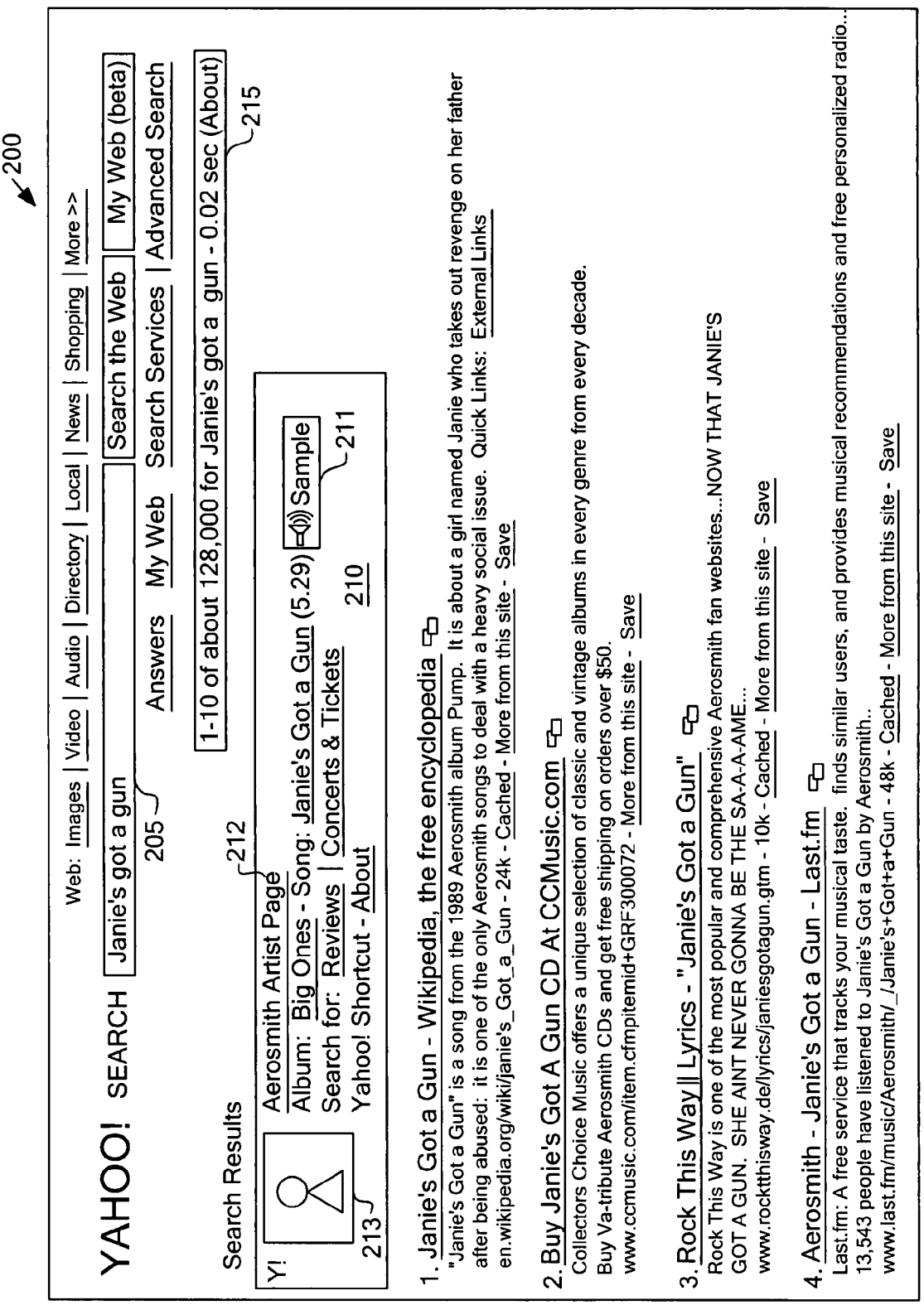
FIG. 2 illustrates an example search results page that includes name entity data, according to an embodiment of the invention.
Figure 3:
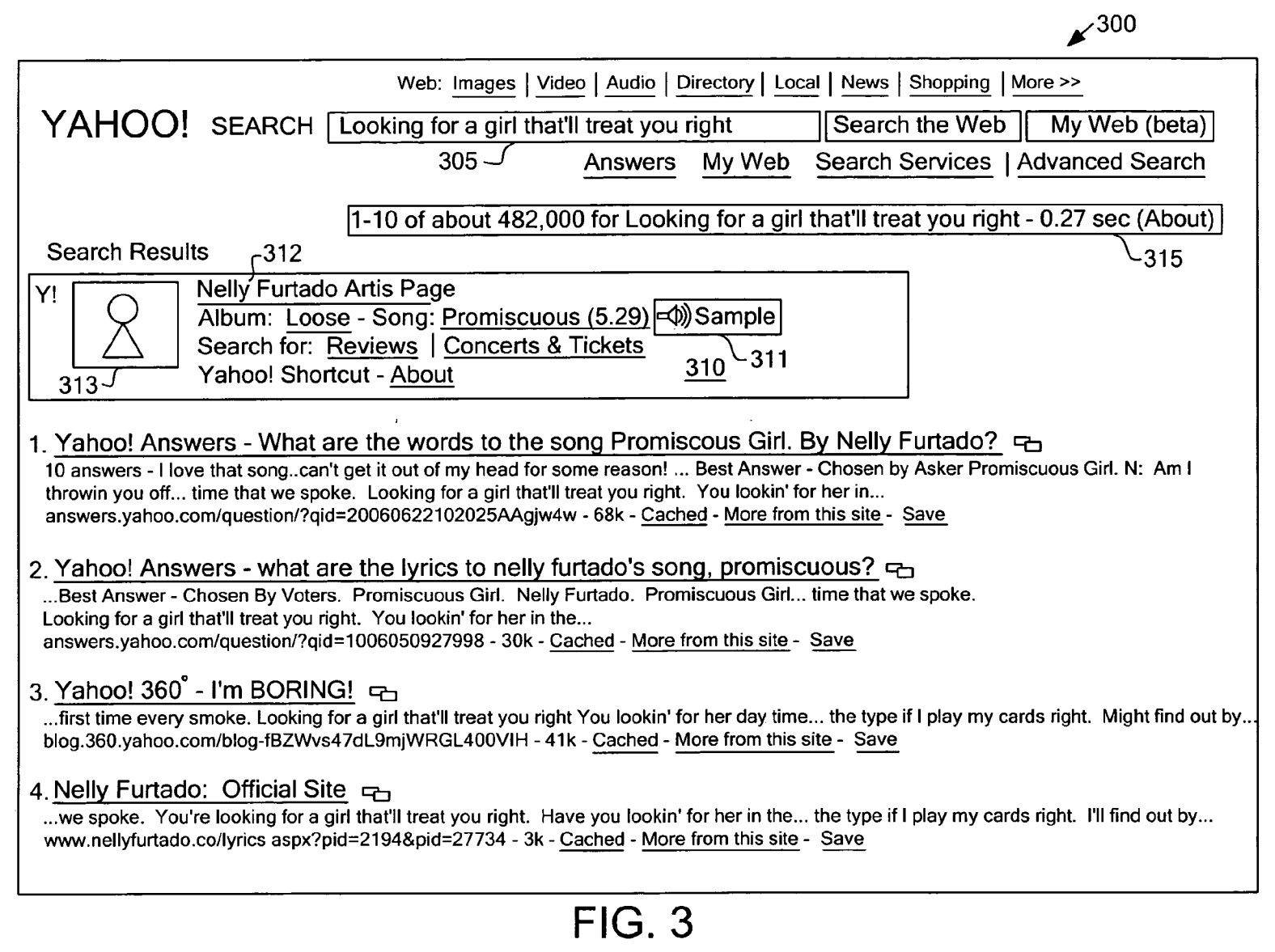

FIGS. 2 and 3 illustrate example search results pages having name entity metadata. The name entity metadata is illustrated in sections 210 and 310 of FIGS. 2 and 3 respectively.

Identifying and Displaying Name Entity Metadata

Figure 4:
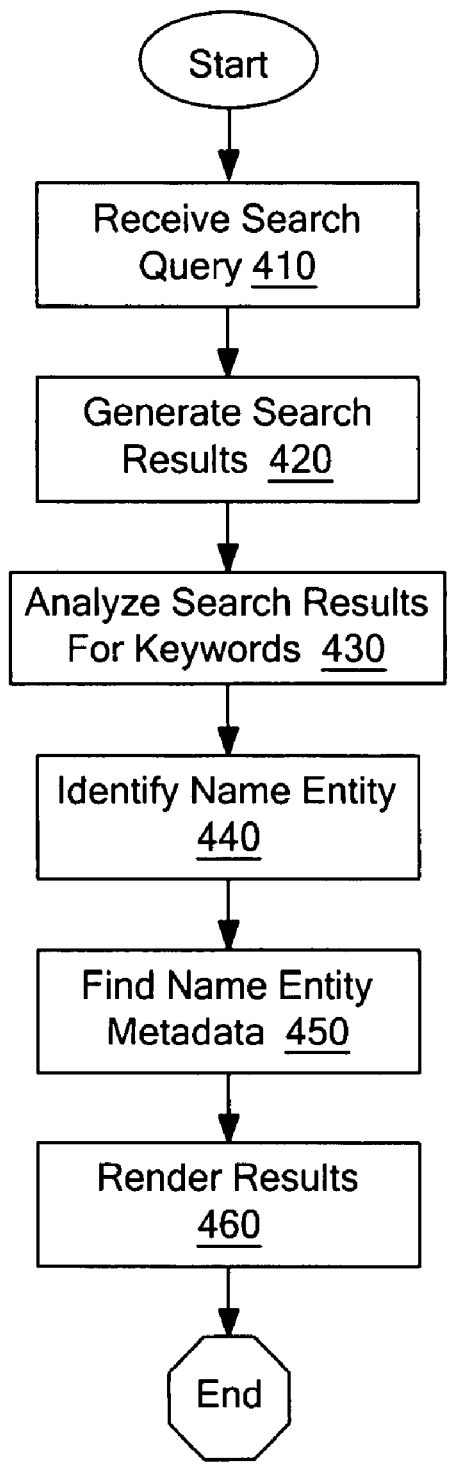
FIG. 4 is a flowchart illustrating a procedure for identifying a name entity and information about the name entity, according to an embodiment of the invention.

Turning to FIG. 4, it is a flowchart illustrating procedure 400 for finding and displaying name entity metadata in a user interface. For example, in one embodiment, procedure 400 allows a user to see information about a name entity in a web browser.

It should be noted that although, procedure 400 is discussed below in terms of a web search engine and a web browser, the principles described in connection with procedure 400 can be applied to a wide variety of other scenarios.

Assume for this example that a typical computer user named Larry wants to find out more information about two songs he heard on the radio. He does not remember much about the songs, but he does remember that the first song was titled "Janie's got a gun" and the second song included lyrics like "looking for a girl that will treat you right". In order to find out more information, Larry accesses the Internet through a web browser, like browser 105. He navigates in his web browser to his favorite web search engine. FIG. 2 illustrates an example web search engine interface 200. In the interface 200, Larry enters the search term "Janie's got a gun" into search field 205 and submits it to the web search engine. In one embodiment, the search terms Larry provided in search field 205 are converted into a search query that is submitted to a search engine, like search engine 130 described in connection with FIG. 1.

At step 410 of procedure 400, the search query is received by the search engine, and the search engine executes it. Note that individually the words in the search term "Janie's got a gun" are not directly related to each other. But, in a broader context, that combination of words has semantic and contextual meaning: they identify a popular rock song by Aerosmith that was introduced on Aerosmith's Pump album. In other words, "Janie's got a gun" relates to a music style, a rock band, an album, and other topics that are potential name entities. Information about these additional topics may be of interest to Larry. In fact, in this example, Larry specifically researched the song to find out who wrote it and to gather other information about the song and its performers. The search engine executes the search query using the search terms to find related information, as well as, a name entity that is likely to be of interest to Larry.

At step 420, the search engine generates a set of search results, like search results 120 described in connection with FIG. 1. In one embodiment, the search results for "Janie's got a gun" include documents from a variety of web sources, for example, the search results might include links to online encyclopedias, online shopping sites, music review sites, and other such locations.

At step 430, the search engine analyzes the search results for keywords. In one embodiment, the number of search result documents analyzed may be limited, for example, to the top ten documents. In this way, the most relevant documents are used to identify candidate name entities for a search query.

For example, in Larry's case, an analysis for keywords in the top ten search results returned by the search engine may include keywords such as "Aerosmith", "Pump", "Rock", and "Music", which are all terms and phrases implicitly related to the song. Once those keywords have been extracted, they are submitted to a threshold analyzer in order to identify which, if any, of the extracted keywords is likely to be of the most interest to Larry. Those keywords are designated as candidate name entities.

At step 440, a threshold analyzer, like threshold analyzer 140, analyzes the keywords using predetermined heuristics and algorithms to identify the candidate name entities. In this example, assume the threshold analyzer simply checks to see which keyword appears in the highest percentage of the top ten search results documents.

For instance, in Larry's case, one of the identified keywords is "Aerosmith". The threshold analyzer checks to see how often "Aerosmith" appears as a keyword in the top ten search results documents. Assume that "Aerosmith" appears in all of them.

A similar analysis is then be performed on the other keywords extracted from the search results documents, but none of the other keywords appears in all of the top search results documents. Thus, they are each rejected as candidate name entities. In the end, "Aerosmith" remains as the sole candidate name entity since it appears in every one of the top ten search results document. At this point, "Aerosmith" may automatically be designated as the name entity for the "Janie's got a gun" search query.

However, if other keywords had been identified as candidate name entities (e.g., they appeared in the same number of top ten search results documents), then a tiebreaker analysis would have been performed to choose between the candidate name entities. Alternatively, in one embodiment, more than one candidate name entity can be designated as a name entity.

At step 450, the designated name entity is passed back to the search engine so the search engine can find metadata for the name entity. In one embodiment, the search engine compares the name entity to an index on a profile information database, like profile information database 134 described in connection FIG. 1. For example, if the profile information database includes an entry with information about Aerosmith, then that information is retrieved and designated as a part of the name entity metadata. For example, in FIG. 2, the profile information database may include photos of Aerosmith 213, links to websites with reviews of their music 212, music sample files 211, and other such information (e.g., links to purchase concert tickets). In addition, the search engine may execute additional search queries (e.g., against its search engine data repository and feed-based data repository) using the name entity as its search term. The information retrieved from these searches, according to one embodiment, can also be included as part of the name entity metadata.

At step 460, all of the name entity information related to Aerosmith is collected by a rendering agent, like rendering agent 160 described in connection with FIG. 1. In one embodiment, the rendering agent compiles the name entity metadata and the search results for the original search query and sends them to Larry's web browser. In one embodiment, the rendering agent selects only a few particular pieces of information to display to the user.

When the information is received from the rendering agent, Larry sees not only search results related to "Janie's got a gun", but also highlighted information about Aerosmith. FIG. 2 illustrates name entity data 210 as rendered in search results page 200. Note that the information displayed includes the photo of Aerosmith 213, a link to their web page 212, a music sample file 211, and other information. Also notice, that the search results for "Janie's got a gun" are also illustrated in FIG. 2. Search results 1, 2, 3, and 4 all include information and links to the typical type of documents and information a search engine retrieves in response to a search query.

After learning about Aerosmith. In FIG. 3, Larry returns to a search engine portal page 300 and submits another search query to find out more about the song that contained the lyrics "looking for a girl that will treat you right." Larry enters the search term into search field 305 and submits it to the search engine. The search engine receives the search query with the search terms and executes the search query. Again, the search engine generates a set of search results from which keywords are extracted.

However, in this case, since the search terms are a more generic, the number of entries in the set of search results is much larger than the set associated with the previous search query (e.g., in FIG. 2, 12,800 hits (shown at 215) for "Janie's got a gun" and in FIG. 3, nearly 500,000 hits (shown at 315) for "looking for a girl that will treat you right"). As a result, instead of looking only at the top ten search results documents, the search engine evaluates a larger set of them. The number of documents evaluated and which documents are evaluated can vary based on factors such as the relevancy of a document, the sheer number of documents to be evaluated, previous searches made by a user, recent searches by other users, the number of hits each search result has received and other such factors. In this case, the evaluated search results are the top 100 search results documents. In one embodiment, the number is increased to include random search results or every $100^{th}$ search result.

In this example, "Nelly Furtado" is a common keyword among the search result documents. Accordingly, after analysis by the threshold analyzer it is identified and designated as a name entity. Name entity metadata relating to Nelly Furtado is retrieved from the search engine (e.g., from the profile information database) and the name entity database is compiled into a profile that is displayed in connection with search results from the search query. FIG. 3 shows the Nelly Furtado profile 310 and the name entity metadata associated with her. The name entity metadata includes a photo 313, links to her homepage 312, sample music files 311, and other information.

In this way, Larry can be shown not only information he specifically requests in a search query, but other information that may be of use or of interest to him.

Hardware Overview

Figure 5:
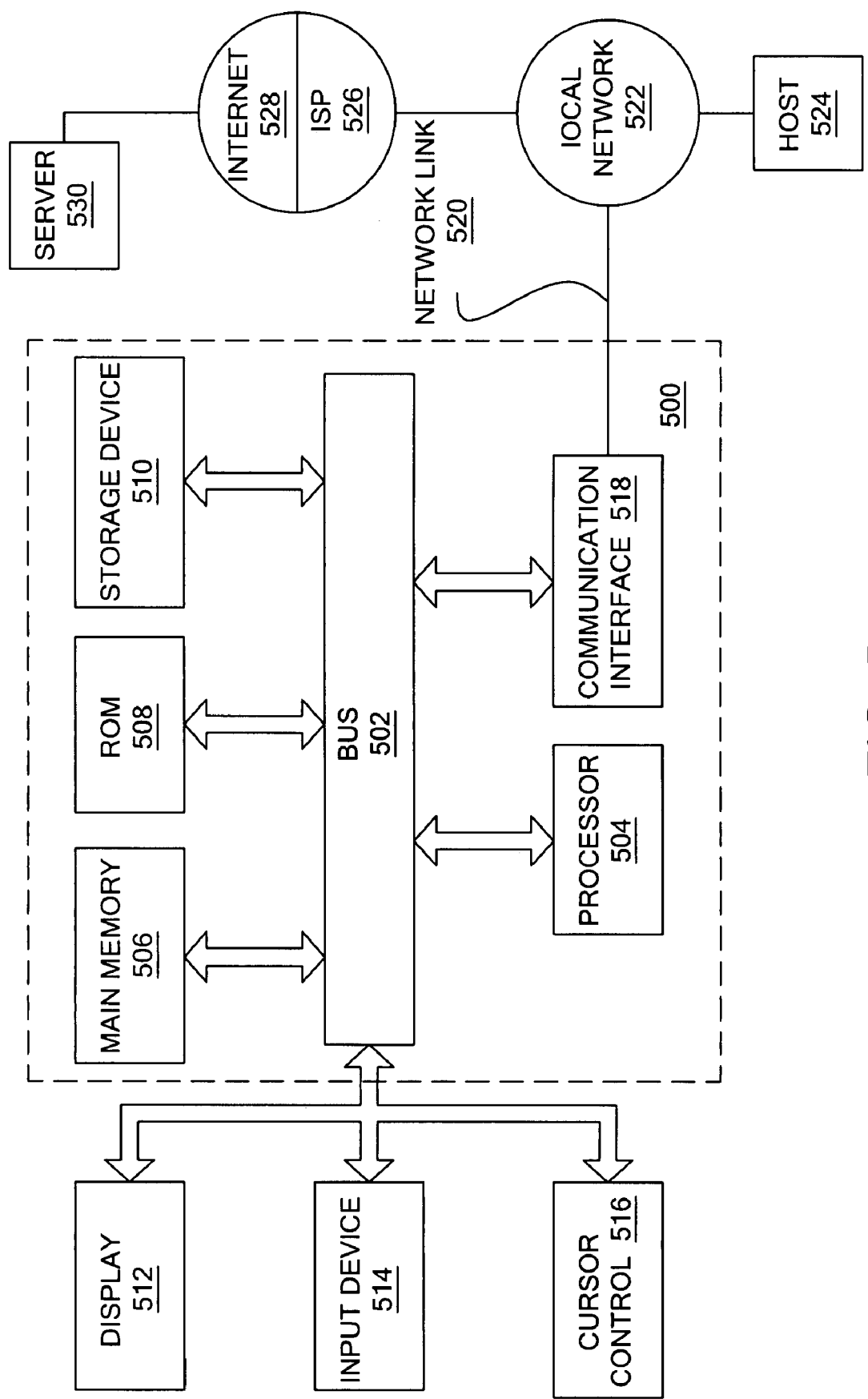
FIG. 5 is a block diagram of a computer system on which implementations of the present invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one implementation of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative implementations, hard-wired circuitry may be used in place of or in combination with software instructions to implement the invention. Thus, implementations of the invention are not limited to any specific combination of hardware circuitry and software.

The term "machine-readable medium" as used herein refers to any medium that participates in providing data that causes a machine to operation in a specific fashion. In an implementation implemented using computer system 500, various machine-readable media are involved, for example, in providing instructions to processor 504 for execution. Such a medium may take many forms, including but not limited to, non-volatile media, volatile media, and transmission media.

Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, implementations of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for displaying information to a user comprising:
    receiving a search query at a search engine, wherein said search query includes a set of search terms;
    generating, by the search engine, a set of search results based on the search terms in the search query;
    extracting a set of keywords from at least a portion of the set of search results;
    heuristically identifying at least one of said keywords from the set of keywords as a name entity, wherein said name entity is not a term in said set of search terms;
    determining name entity information to be presented to a user;
    wherein determining name entity information includes obtaining information related to said name entity from a source other than the search results;
    constructing at the search engine a search results page that includes both a listing of said set of search results and said name entity information; and
    sending the search results page to a user as a response to the search query,
    wherein heuristically identifying at least one of said keywords from the set of keywords includes determining if the at least one of said keywords appears in at least a threshold percentage of search results,
    wherein the method steps are performed by one or more computing devices.

2. The method of claim 1, wherein said name entity is at least one of a person, a place, and an object.

3. The method of claim 1, wherein said name entity is selected based on the presence of an index entry in a profile information database.

4. The method of claim 3, wherein said name entity information includes profile information derived from the profile information database.

5. The method of claim 1, wherein determining name entity information to be presented to a user comprises:
    submitting said name entity to the search engine as a new search query;
    generating, by the search engine, a new set of search results associated with the name entity; and
    generating at least a portion of the name entity information based on the new set of search results.

6. The method of claim 5, wherein the new set of search results generated by the search engine includes information retrieved from a feed-based data repository.

7. The method of claim 1, wherein extracting a set of keywords from at least a portion of the set of search results includes extracting the set of keywords from a top portion of search results in said set of search results.

8. The method of claim 1, wherein said threshold percentage is eighty percent.

9. The method of claim 1, wherein heuristically identifying at least one of said keywords from the set of keywords as a name entity includes:
identifying two or more candidate name entities; and
selecting the name entity from said two or more candidate name entities based on a set of threshold metrics.

10. The method of claim 1, wherein obtaining information includes performing an additional search using a search query based at least in part on the name entity.

11. The method of claim 10, wherein the additional search includes a comparison to a profile information database.

12. A machine-readable storage medium storing one or more sequences of instructions, which when executed perform the method recited in claim 1.

13. A machine-readable storage medium storing one or more sequences of instructions, which when executed perform the method recited in claim 2.

14. A machine-readable storage medium storing one or more sequences of instructions, which when executed perform the method recited in claim 3.

15. A machine-readable storage medium storing one or more sequences of instructions, which when executed perform the method recited in claim 4.

16. A machine-readable storage medium storing one or more sequences of instructions, which when executed perform the method recited in claim 5.

17. A machine-readable storage medium storing one or more sequences of instructions, which when executed perform the method recited in claim 6.

18. A machine-readable storage medium storing one or more sequences of instructions, which when executed perform the method recited in claim 7.

19. A machine-readable storage medium storing one or more sequences of instructions, which when executed perform the method recited in claim 8.

20. A machine-readable storage medium storing one or more sequences of instructions, which when executed perform the method recited in claim 9.

21. A machine-readable storage medium storing one or more sequences of instructions, which when executed perform the method recited in claim 10.

22. A machine-readable storage medium storing one or more sequences of instructions, which when executed perform the method recited in claim 11.

* * * * *